United States Patent [19]

Blier et al.

[11] Patent Number: 5,339,288
[45] Date of Patent: Aug. 16, 1994

[54] UNDERWATER SOUND SOURCE WITH REMOTE CONTROLLED ACTUATOR

[75] Inventors: Darren J. Blier, Westerly, R.I.; Christopher J. Dubord, Niantic, Conn.; David W. Grande, Bradford, R.I.

[73] Assignee: The United States of America as represented by the Secretary of the Navy, Washington, D.C.

[21] Appl. No.: 89,913

[22] Filed: Jul. 12, 1993

[51] Int. Cl.⁵ ............................................. H04R 23/00
[52] U.S. Cl. ..................................... 367/145; 181/116; 181/118; 441/11; 441/33
[58] Field of Search ............... 367/145; 181/116, 118; 441/11, 32, 33

[56] References Cited

U.S. PATENT DOCUMENTS

| | | | |
|---|---|---|---|
| 3,148,618 | 9/1964 | Richard | 181/116 |
| 3,530,952 | 9/1970 | Epstein et al. | 181/116 |
| 3,724,374 | 4/1973 | Somerville et al. | 181/116 |
| 3,799,094 | 3/1974 | Hill | 181/116 |
| 3,937,296 | 2/1976 | Larson | 181/118 |
| 4,975,890 | 12/1990 | Wolf et al. | 367/145 |
| 5,003,515 | 3/1991 | Will et al. | 367/145 |
| 5,175,712 | 12/1992 | Vaccaro et al. | 367/145 |

*Primary Examiner*—J. Woodrow Eldred
*Attorney, Agent, or Firm*—Michael J. McGowan; Prithvi C. Lall; James M. Kasischke

[57] ABSTRACT

An underwater sound source with a remote controlled actuator comprising a buoy having a buoyant portion, a plurality of launch tubes storing acoustic charges, a radio transceiver, control circuitry, hinged doors at the bottom of the tubes, and a safety release circuit. The hinged doors are secured by pneumatic actuators to allow a selected door to open on a radio signal from a remote location. The charges are pressure sensitive and will explode at a preselected depth. A launch platform can deploy the device and remove itself from the general vicinity of the test site. The device releases the charges on command from a transmitter aboard a vessel and reports on the status of the launch tube doors to a receiver aboard a vessel. A safety valve can be opened automatically or on power failure to insure that all acoustic charges have been discharged.

10 Claims, 4 Drawing Sheets

UNDERWATER SOUND SOURCE WITH REMOTE CONTROLLED ACTUATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to sonar sound sources and more particularly to a surface deployed buoy that generates underwater sonic impulses by releasing acoustic charges.

2. Description of the Prior Art

Use of underwater explosive charges to provide sonic impulses is well known in the art. Echo location, sensor testing and signalling are some of the applications requiring underwater deployment of such sonic charges. In echo location the sonic charge is used in the vicinity of hydrophones to provide an impulse for echo location of submerged geologic structures or vessels. In sensor testing applications sonic charges are released at a fixed depth and distance to determine the performance characteristics of underwater sensors. Underwater charges can also be timed to explode in a coded pattern to communicate between a subsurface craft and a hydrophone.

Submarine launched acoustic charge release devices are often deployed for covertly signalling surface craft. The device used in covert signalling must be launched from a torpedo tube and provide coded release of signal charges. The device should not be visible from the surface. In one prior art device exploding bolts are used to separate the charge containing portion of the device from the control portion of the device. Charges are ejected in a coded sequence by explosive bolts in the charge containing portion of the device. A drogue is deployed from the control portion of the device to control the release of charges and prevent the ejected charge from damaging the control portion.

Aircraft deployed acoustic charge release devices are typically used in echo location applications. In this use, the explosion of a charge provides a sound source, and a sonobuoy dropped from the airplane act as pickup devices for echo location of submarines and underwater objects. Aircraft deployed devices are designed to release an underwater charge from a device containing a plurality of charges in response to a radio signal. The aircraft deployed device releases charges arrayed on a streamer to allow detonation when the buoy is signalled. The device has no provisions for recovery or reloading.

In test applications, charges are often deployed in the vicinity of an array of submarine acoustic sensors. Acoustic charges must be pressure sensitive to explode at a pre-set depth and the charges must be deployed within a standard distance from the array. The United States Navy has standard acoustic charges, known as signal underwater sound (SUS) charges, available for use in this application. If a surface vessel is used to deploy the charges, after deployment of a charge the vessel must be moved away from the charge deployment site to avoid interference with the acoustic signal because of echo from the hull or engine noise.

Each of the above methods of underwater acoustic charge deployment is deficient when deploying acoustic charges for test purposes. When testing acoustic sensors, charges must be released near the sensor with consistency. Neither aircraft nor submarines can release an acoustic source with sufficient accuracy for test purposes. Existing submarine and aircraft acoustic source devices do not allow for depth sensitive charges. Furthermore, aircraft and submarine deployment is too expensive to be practical for test purposes. Releasing acoustic charges from surface vessels is unavailable because of echo caused by the presence of the vessel and engine noise.

One prior art device correcting these deficiencies is Vaccaro et al., U.S. Pat. No. 5,175,712. The device of Vaccaro '712 provides for launch of acoustic charges at preselected time intervals from an autonomous craft but does not provide for acoustic charge launch on command from a platform nor any means of informing a recovery platform that all charges have been launched. Because of these deficiencies, the crew retrieving the '712 buoy does not know whether a charge remains in the buoy. Furthermore, the electrical door latch system of the '712 patent is unreliable and requires an excessive amount of power.

SUMMARY OF THE INVENTION

Accordingly, it is a general purpose and object of the present invention to provide a device for deploying acoustic charges.

It is a further object that such device be deployable from a deploying platform, such as a surface vessel, an aircraft, or a submarine vessel.

Another object is that such device release said acoustic charges at pre-set depths with consistent proximity to a sensor array.

Yet another object is that such device release said explosive charges when such device is remotely signalled to allow the deploying platform to move away from the site of the deployment.

A further object is that such device provide a means for reporting its charge status and for ejecting all explosive charges before device retrieval.

These objects are accomplished with the present invention by providing an underwater sound source deployment device with remote controlled actuators comprising a buoyant portion, a plurality of launch tubes storing acoustic charges (for example, a standard U.S. Navy SUS MK 59 acoustic charge), a radio transceiver, control circuitry, remotely controllable hinged doors at the bottom of the tubes, and a safety release circuit. The doors are secured by pneumatic actuators to allow the doors to open when the transceiver receives a radio signal from a remote location. The charges are pressure sensitive and will explode at a preselected depth. A vessel can deploy the device and remove itself from the general vicinity of the test site. The device releases the charges on command from a transmitter aboard a vessel and transmits the status of the launch tube doors to a receiver aboard the vessel. A safety valve can be opened automatically or on power failure to insure that all acoustic charges have been discharged.

BRIEF DESCRIPTION OF THE DRAWINGS

A more complete understanding of the invention and many of the attendant advantages thereto will be readily appreciated as the invention becomes better understood by reference to the following detailed description when considered in conjunction with the accompanying drawings wherein.

DESCRIPTION OF THE PREFERRED EMBODIMENT

Figure 1:
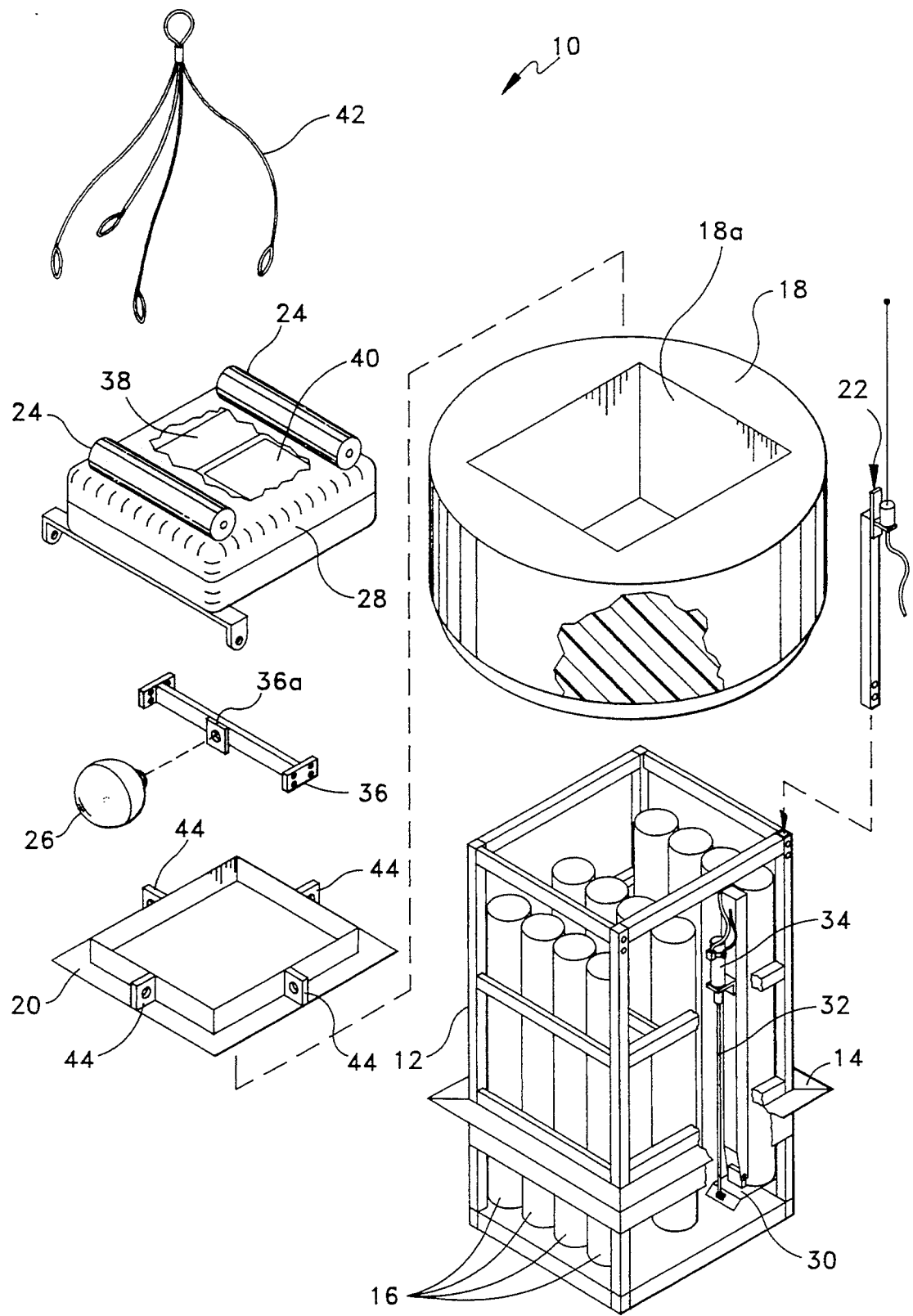
FIG. 1 shows a partially exploded and cut away perspective view of the underwater sound source according to the present invention.

Referring now to FIG. 1 there is shown a partially exploded view of an underwater sound source buoy 10. Underwater sound source buoy 10 comprises a rectangular frame 12 with a lower mounting bracket 14 disposed thereon, a plurality of launch tubes 16, a floatation collar 18, an upper mounting bracket 20, an antenna assembly 22, two pneumatic reservoirs 24, a discharge bladder 26 with gas therein, and a control housing 28. Frame 12 is a hollow, rectangular, box shaped frame comprising vertical and horizontal metal structural members, preferably made from aluminum, fixedly attached to each other to form frame 12, Launch tubes 16 are disposed vertically inside frame 12 and affixed thereto using well known clamping means. Each launch tube 16 is open at the upper end and sealed at the lower end by a hinged door 30. For each tube, a control rod 32 is pivotally attached between hinged door 30 and a pneumatic actuator 34 positioned on the side of tube 16 to operate hinged door 30.

Lower mounting bracket 14 is disposed a preselected distance below the top of frame 12 and fixed about frame 12 in a horizontal plane. Floatation collar 18 is cylindrical with a rectangular aperture 18a passing therethrough along the vertical axis thereof. Collar 18 is preferably made from Surlyn plastic, but it can be made from any corrosion resistant material providing sufficient buoyancy to support buoy 10 in the ocean. Floatation collar 18 is placed over frame 12 and rests upon lower mounting bracket 14. Aperture 18a provides a clearance fit between floatation collar 18 and frame 12. Upper mounting bracket 20 is affixed to frame 12 above floatation collar 18 to restrain movement of collar 18 in a vertical direction. An I-shaped bracket 36 having a bladder mount 36a is centered and fixed between the uppermost horizontal members of frame 12. Discharge bladder 26 is mounted to bladder mount 36a on I-shaped bracket 36 by a stem on bladder 26. Control housing 28 with control circuitry 38 and a power supply 40 therein is attached to the upper sides of frame 12 and bracket 36. Antenna assembly 22 is attached by bolts to the upper surface of frame 12 in order that it project above buoy 10. Two pneumatic reservoirs 24 are disposed on and affixed to control housing 28 and are pneumatically connected to a regulator (shown schematically below) within housing 28. The regulator is in turn pneumatically connected to twelve control valves (shown schematically below) located within housing 28 with each control valve associated with one actuator 34 on each launch tube 16. The pneumatic distribution system will be further described in the ensuing text and accompanying figure. A lifting harness 42 is connected to handling eyes 44 disposed integrally on the upper surface of mounting bracket 20 to allow buoy 10 to be lifted.

In use, buoy 10 is assembled with floatation collar 18 held in place between upper and lower mounting brackets 20 and 14 respectively. Upper mounting bracket 20 is affixed to frame 12. Acoustic charges are inserted in launch tubes 16. Buoy 10 is lowered into the water using lifting harness 42. Floatation collar 18 provides buoyancy to support buoy 10 on the surface with the lower ends of launch tubes 16 positioned below the surface of the water.

Figure 2:
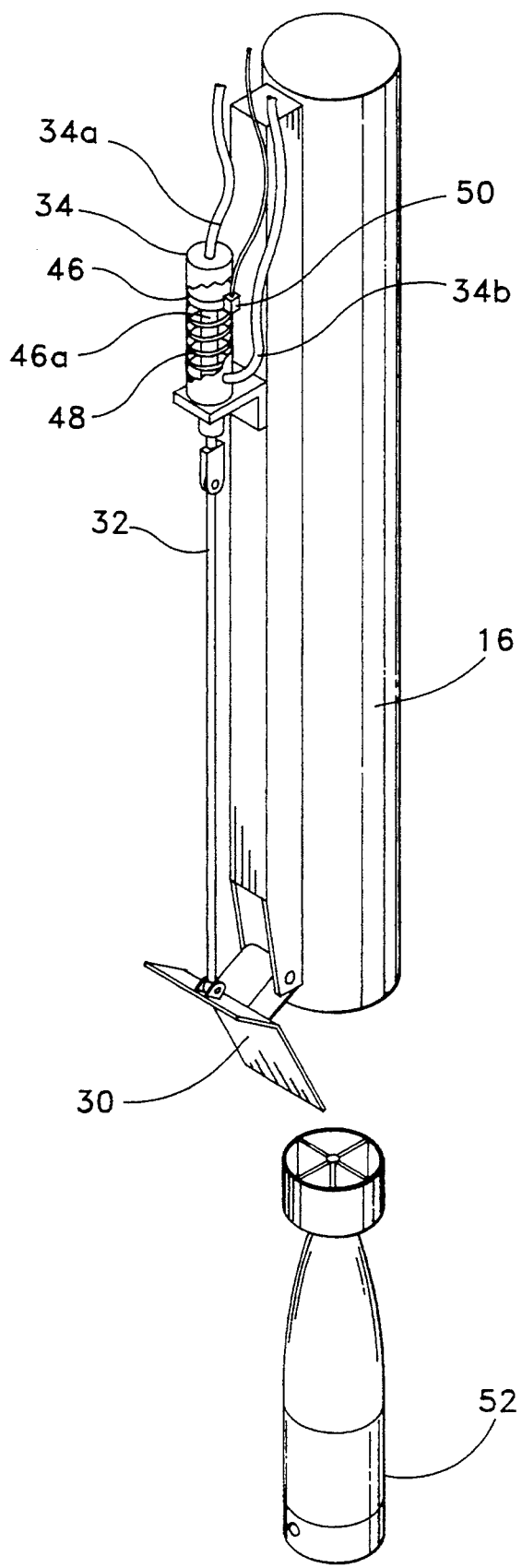
FIG. 2 shows a detail of the pneumatic release mechanism of the underwater sound source of FIG. 1.

Referring now to FIG. 2, there is shown a detail view of the lower end of a typical launch tube 16. Pneumatic actuator 34 having a magnetic piston 46, a piston rod 46a, a piston bias spring 48, and a Hall effect sensor 50 is shown disposed on the side of launch tube 16. Control rod 32 is pivotally attached between piston rod 46a and hinged door 30 so that retraction of piston 46 causes translation of control rod 32 to open hinged door 30. Control gas from reservoir 24 is provided to pneumatic actuator 34 by a gas supply port 34a disposed on actuator 34. Gas supply port 34a is in communication with one of the control valves joined to the regulator to provide gas to compensate for leaks in pneumatic actuator 34. Hinged door 30 remains closed when pneumatic actuator 34 is charged; however, when pneumatic actuator 34 is discharged, piston bias spring 48 causes piston 46, rod 46a, and control rod 32 to retract thereby opening hinged door 30. Pressurized gas in actuator 34 is vented to the control housing by one of the control valves disposed in the housing. Discharge bladder 26 is pneumatically connected to a retraction input port 34b on each actuator 34 to prevent actuator 34 from taking in environmental water on retraction. Hall effect sensor 50 is disposed on the side of each actuator 34 to detect the position of magnetic piston 46. Hall effect sensor 50 is electrically connected to control circuitry 38 to provide feedback to the operator. Further details of the control circuitry will be discussed in the ensuing text in the description of FIG. 4.

Before deployment of underwater sound source buoy 10, pneumatic actuators 34 are charged, and each tube 16 is loaded with an acoustic charge 52. Charges 52 have a clearance fit within tubes 16 and are held in place by hinged doors 30 which are retained by pneumatic actuators 34. To launch a charge 52, the control circuitry sends an electrical impulse to the control valve pneumatically connected to the appropriate launch tube 16 which causes pneumatic actuator 34 to allow gas to escape from actuator 34 thereby retracting piston 46 and control rod 32. Piston 46 retraction is aided by piston bias spring 48. Retraction of control rod 32 causes opening of hinged door 30 and gravity dropping of acoustic charge 52.

Figure 3:
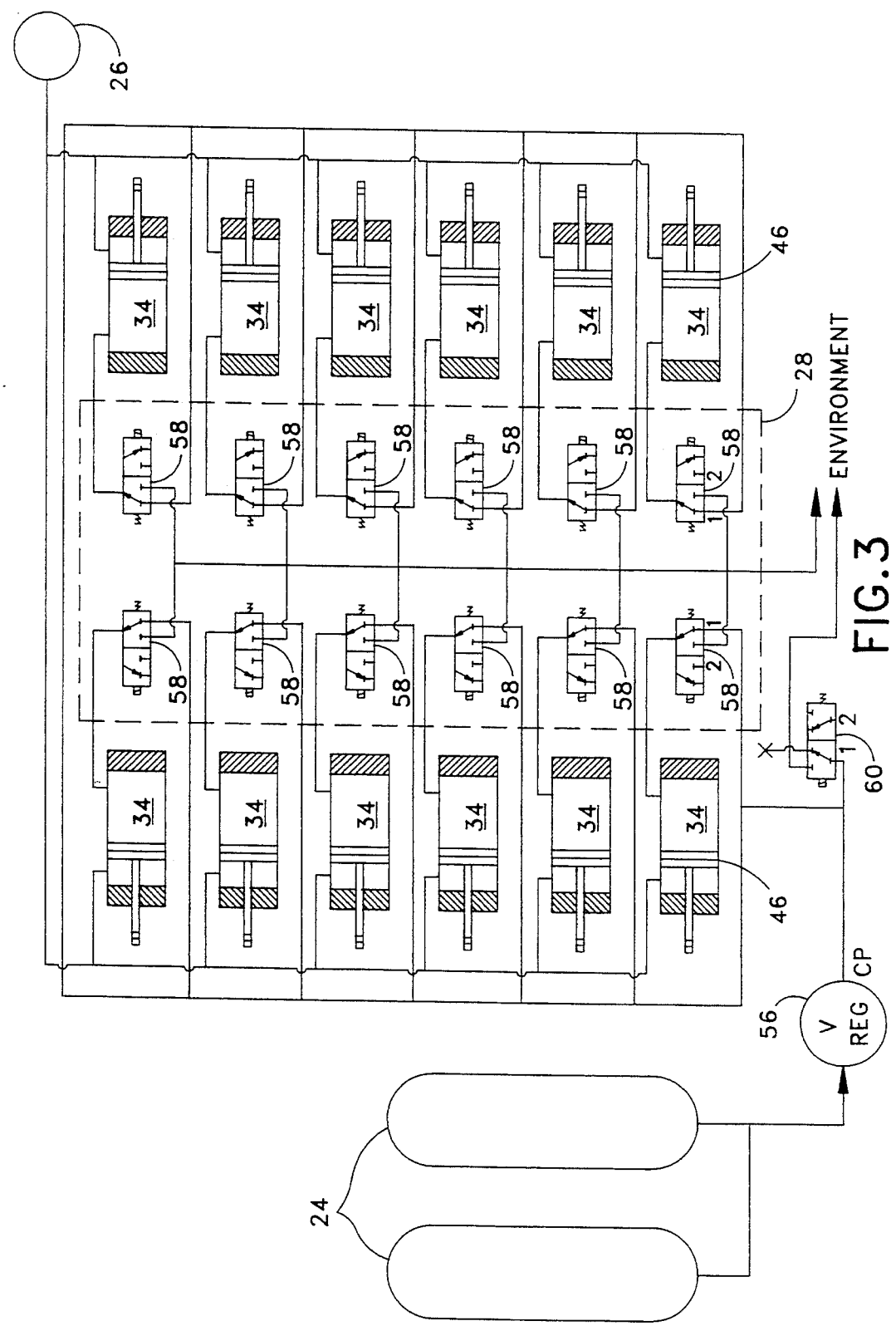
FIG. 3 shows a diagram of the pneumatic circuit of the current invention.

Referring now to FIG. 3, there is shown a diagram of the pneumatic circuit of the current invention. The pneumatic circuit of the current invention comprises two pneumatic reservoirs 24, a constant pressure regulator 56, a plurality of pneumatic actuators 34 one for each launch tube 16, a corresponding plurality of electrically operated control valves 58, discharge bladder 26, and a safety release valve 60. Before deployment, pneumatic reservoirs 24 are filled with compressed gas at a high pressure. Regulator 56 in communication with reservoirs 24 lowers this gas pressure to operate pneumatic actuators 34. A plurality of pneumatic actuators 34 corresponding to the number of launch tubes 16 is shown in communication with regulator 56. Gas flow to each actuator 34 is controlled by a corresponding control valve 58 in communication with each actuator 34.

In normal operating position, position 1, control valve 58 allows gas to flow from regulator 56 to actuators 34 to replenish escaping gas. When a signal from control circuitry is received by one valve 58, valve 58 moves from position 1 to position 2 thereby allowing gas to be released from actuator 34 to control housing 28 causing movement of spring loaded piston 46. The back side of piston 46 is in communication with discharge bladder 26 to backfill piston 46 with the gas therein and prevent siphoning of environmental water. Electrically controlled safety release valve 60 is also connected to regulator 56. During normal operation, release valve 60 is normally in closed position 1 to maintain a constant operating pressure between actuators 34 and regulator 56; however, when release valve 60 receives a signal from control circuitry, valve 60 moves to vent position 2 and all pneumatic gas including that remaining in pneumatic reservoirs 24 is released to the environment. Discharge of system pressure results in the opening of all hinged doors to allow all unlaunched acoustic charges to fall from the launch tubes.

Figure 4:
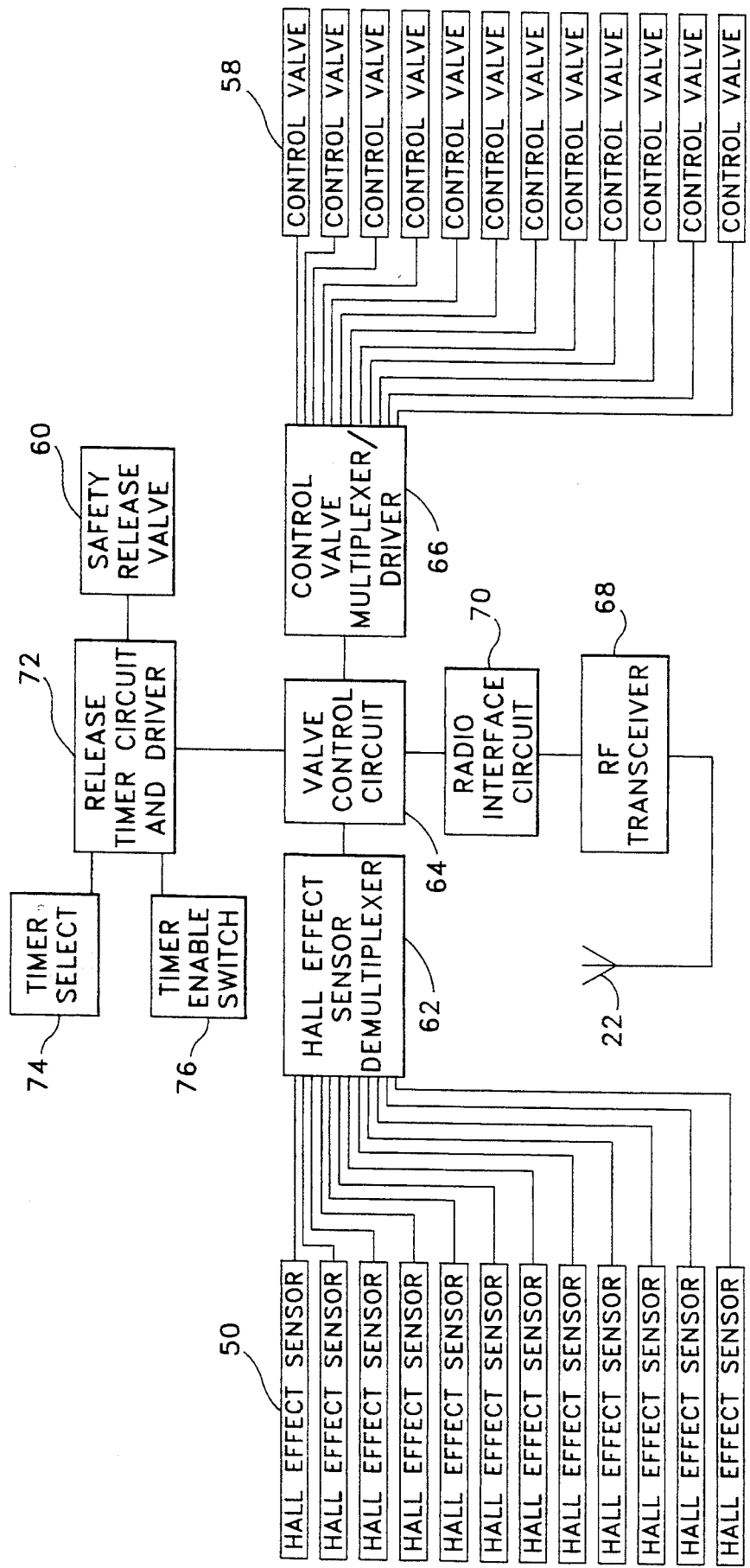
FIG. 4 shows a block diagram of the electric control circuitry of the current invention.

Referring now to FIG. 4, there is shown a block diagram of the control circuitry of the current invention. The control circuitry comprises a hall effect sensor demultiplexer 62, a valve control circuit 64, a control valve multiplexer/driver 66, an RF transceiver 68, a radio interface circuit 70, and a release timer circuit and driver 72. The control circuitry utilizes information from a plurality of hall effect sensors 50 and acts through a plurality of control valves 58 to release acoustic charges. For safety purposes, the underwater sound source buoy is provided with release timer circuit 72 connected with safety release valve 60 to release all charges when a preset time period has elapsed or when the buoy runs out of power. Before deployment, the release time period can be set and timer circuit 72 can be started using a timer select thumbwheel 74 and a timer enable switch 76 disposed on the control housing. When the preselected time elapses or electrical power to circuit 72 is interrupted, a driving signal being transmitted to safety release valve 60 discontinues thereby causing safety release valve to depressurize the pneumatic system.

Upon deployment of the buoy, an acoustic charge can be launched from the buoy by sending a radio signal to the buoy. The radio signal is received by RF transceiver 68 electrically connected to antenna 22 and radio interface circuit 70. Radio interface circuit 70 is in turn connected to valve control circuit 64. Radio interface circuit 70 functions as a filter, an analog to digital convertor, and a digital to analog convertor. Radio interface circuit 70 filters the signal received from RF transceiver 68 and converts the analog signal to a digital signal which is then transmitted to valve control circuit 64. Valve control circuit 64 determines which control valve 58 should be actuated and transmits a digital signal to a control valve multiplexer/driver 66. Control valve multiplexer/driver 66 is electrically connected to a plurality of control valves 58 each controlling an actuator on a launch tube. Multiplexer/driver 66 receives a digital signal from control circuit 64, determines which control valve 58 should receive an impulse, and provides a driving impulse to selected valve 58 causing selected control valve 58 to depressurize the actuator and open the appropriate hinged door. Control valves 58 are actuated according to a preselected launch sequence to avoid imbalancing the buoy.

When the actuator piston moves, removal of the magnetic field caused by the magnetic actuator piston results in changing the state of Hall effect sensor 50. Hall effect sensor demultiplexer 62 receives the change of state from Hall effect sensor 50 and converts the signal to a digital signal for transmission to valve control circuit 64 thereby communicating which Hall effect sensor 50 was activated. Valve control circuit 64 transmits this signal to radio interface circuit 70 which converts the signal to an analog signal for transmission by RF transceiver 68. The remote operator receiving the signal can thereby determine if the charge launch was effective.

The advantages of the present invention over the prior art are that this device provides a durable acoustic source which can be deployed from a launch platform. The launch platform can then be moved away from the device to avoid acoustic interference. The device will release pressure sensitive, detonation type acoustic charges upon signal from a remote station. The pneumatic system of the present invention insures that all acoustic charges are deployed before the invention is recovered, thereby providing greater safety to the recovery crew.

What has thus been described is an underwater sound source with remote controlled actuators.

Obviously many modifications and variations of the present invention may become apparent in light of the above teachings. For example: the device could have any number of launch tubes; spring loaded actuators, hydraulic actuators or other devices could be used to open the hinged doors in lieu of the pneumatic actuators of the current invention; the device could have a safety device to prevent accidental discharge of the charges; the launch tubes could have springs therein to force the charges from the launch tubes; and the frame could be any shape.

In light of the above, it is therefore understood that within the scope of the appended claims, the invention may be practiced otherwise than as specifically described.

What is claimed is:

1. A radio controlled acoustic sound source for deploying acoustic charges comprising:

a frame having a plurality of vertical members and a plurality of horizontal members disposed so as to form a rectangular open-sided box having a longitudinal axis;

a buoyant collar disposed about and affixed to said frame, said buoyant collar providing buoyant force to support the buoy partially above the surface of the ocean in such a way that said longitudinal axis remains substantially vertical;

a plurality of hollow launch tubes open on at least the lower end thereof, each said launch tube provided for holding and launching at least one said acoustic charge, said launch tubes being disposed vertically within said frame;

a plurality of hinged doors, each of said hinged doors being disposed upon the lower end of each of said plurality of launch tubes to retain said charges in said launch tube and allow escape of said charges upon launch, said plurality of hinged doors each being hinged to one said launch tube at the periphery of said door to allow said door to open from a horizontal position obstructing the lower end of said launch tube to the vertical position clearing the lower end of said launch tube;

a plurality of electrically controlled actuator means, one actuator means being disposed on the lower end of each said launch tube, each said actuator means being controllable to open each said hinged door;

a power supply positioned on the top of said frame;

a radio receiver positioned on the top of said frame and powered by said power supply, said receiver receiving radio control signals;

an electrical control means positioned on the top of said frame and powered by said power supply, said electrical control means being electrically connected to said actuator means and to said radio receiver to cause said actuator means to open one of said hinged doors deploying said acoustic charges contained in said launch tube when a command is received by said radio receiver;

a sensor means operatively connected with each hinged door to generate a signal when said hinged door changes from the horizontal to the vertical position and communicates said signal with identification of said hinged door; and a radio transmitter powered by said power supply having an antenna, said radio transmitter being electrically connected to said sensor means to transmit said signal with identification to said remote source to inform said remote source of the position of said hinged door.

2. An apparatus according to claim 1 wherein said sensor means comprises:

a plurality of electrical sensors with each sensor operatively connected with each said hinged door to generate a signal when said hinged door changes from the horizontal to the vertical position; and a sensor multiplexer electrically connected to said plurality of electrical sensors to encode said signal from one said sensor into a form which allows communication of said signal and identification of said source sensor to said radio transmitter.

3. An apparatus according to claim 2 further comprising;

at least one pneumatic reservoir disposed on said frame having pressurized pneumatic fluid therein;

said plurality of electrically controlled actuator means further comprising a plurality of electrically controlled pneumatic actuators of the type wherein introduction of pneumatic fluid causes extension of said actuator and exhaustion of pneumatic fluid causes retraction of said actuator with each said actuator disposed on each said launch tube to control each said hinged door, said actuator being mechanically connected to said hinged door to hold said hinged door shut when said actuator is extended, and a plurality of electrically operated control valves powered by said power supply, each said control valve having a source port, an actuator port, and a discharge port, said source port being in pneumatic communication with said pneumatic reservoir, and said actuator port being in pneumatic communication with one of said plurality of pneumatic actuator, and each said control valve having two positions with one position allowing pneumatic communication from said source port to said actuator port and the second said position allowing pneumatic communication from said actuator port to said discharge port, each said control valve being electrically connected to said electrical control means to allow positioning of said control valve when said control means transmits a signal to said control valve; and a discharge bladder in pneumatic communication with said discharge port for accepting pneumatic fluid discharged from said control valves to prevent said control valves from siphoning water.

4. An apparatus according to claim 3 further comprising:

an electrical release timer powered by said power supply having a timer enable switch and a time select means, said timer enable switch starting operation of said release timer, said time selection means allowing selection of a time for activation of said release timer; and an electrically operated safety release valve electrically connected to said release timer, said safety release valve being pneumatically interposed between said regulator and said plurality of control valves to allow said safety release valve to receive a signal causing pneumatic fluid to be flushed from said pneumatic reservoirs, said pneumatic actuators and said control valves to allow said actuators to retract whereby said hinged doors open releasing said acoustic charges.

5. A radio controlled acoustic sound source for deploying acoustic charges comprising:

a frame having a plurality of vertical members and a plurality of horizontal members disposed so as to form a rectangular open-sided box having a longitudinal axis;

a buoyant collar disposed about and affixed to said frame, said buoyant collar providing buoyant force to support the buoy partially above the surface of the ocean in such a way that said longitudinal axis remains substantially vertical;

a plurality of hollow launch tubes open on at least the lower end thereof., each said launch tube provided for holding and launching at least one said acoustic charge, said launch tubes being disposed vertically within said frame;

a plurality of hinged doors, each of said hinged doors being disposed upon the lower end of each of said plurality of launch tubes to retain said charges in said launch tube and allow escape of said charges upon launch, said plurality of hinged doors each being hinged to one said launch tube at the periphery of said door to allow said door to open from a horizontal position obstructing the lower end of said launch tube to the vertical position clearing the lower end of said launch tube;

a plurality of electrically controlled actuator means, one actuator means being disposed on the lower end of each said launch tube, each said actuator means being controllable to open each said hinged door;

a power supply positioned on the top of said frame;

a radio receiver positioned on the topof said frame and powered by said power supply, said receiver receiving radio control signals;

an electrical control means positioned on the top of said frame and powered by said power supply, said electrical control means being electrically connected to said actuator means and to said radio receiver to cause said actuator means to open one of said hinged doors deploying said acoustic charges contained in said launch tube when a command is received by said radio receiver;

a sensor means operatively connected with each said hinged door and electrically connected to said control means to generate a status signal when said hinged door changes from the horizontal to the vertical position and communicate said signal to said control means; and a radio transmitter powered by said power supply, said radio transmitter being electrically connected to said control means, said control means transferring said status signal to said transmitter, said transmitter transmitting a radio signal giving status of one of said plurality of hinged doors.

6. An apparatus according to claim 5 wherein said sensor means comprises:

a plurality of electrical sensors with each sensor operatively connected with each said hinged door to generate a signal when said hinged door changes from the horizontal to the vertical position; and a sensor multiplexer electrically connected to said plurality of electrical sensors to encode said signal from one said sensor into a form which allows communication of said signal and identification of said source sensor to said control means.

7. An apparatus according to claim 6 further comprising;

at least one pneumatic reservoir disposed on said frame having pressurized pneumatic fluid therein;

said plurality of electrically controlled actuator means further comprising a plurality of electrically controlled pneumatic actuators of the type wherein introduction of pneumatic fluid causes extension of said actuator and exhaustion of pneumatic fluid causes retraction of said actuator with each said actuator disposed on each said launch tube to control each said hinged door, said actuator being mechanically connected to said hinged door to hold said hinged door shut when said actuator is extended, and a plurality of electrically operated control valves powered by said power supply, each said control valve having a source port, an actuator port, and a discharge port, said source port being in pneumatic communication with said pneumatic reservoir, and said actuator port being in pneumatic communication with one of said plurality of pneumatic actuator, and each said control valve having two positions with one position allowing pneumatic communication from said source port to said actuator port and the second said position allowing pneumatic communication from said actuator port to said discharge port, each said control valve being electrically connected to said electrical control means to allow positioning of said control valve when said control means transmits a signal to said control valve; and a discharge bladder in pneumatic communication with said discharge port for accepting pneumatic fluid discharged from said control valves to prevent said control valves from siphoning water.

8. An apparatus according to claim 7 further comprising:

an electrical release timer powered by said power supply having a timer enable switch and a time select means, said timer enable switch starting operation of said release timer, said time selection means allowing selection of a time for activation of said release timer; and an electrically operated safety release valve electrically connected to said release timer, said safety release valve being pneumatically interposed between said regulator and said plurality of control valves to allow said safety release valve to receive a signal causing pneumatic fluid to be flushed from said pneumatic reservoirs, said pneumatic actuators and said control valves to allow said actuators to retract whereby said hinged doors open releasing said acoustic charges.

9. An apparatus according to claim 8 wherein said radio transmitter is integral with said radio receiver.

10. An apparatus according to claim 5 wherein said radio transmitter is integral with said radio receiver.

* * * * *